US008405855B2

(12) United States Patent  (10) Patent No.: US 8,405,855 B2
Asakawa  (45) Date of Patent: Mar. 26, 2013

(54) IMAGE FORMING APPARATUS AND INITIAL SCREEN DISPLAY METHOD

(75) Inventor: Minoru Asakawa, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 505 days.

(21) Appl. No.: 12/645,838

(22) Filed: Dec. 23, 2009

(65) Prior Publication Data

US 2010/0171983 A1  Jul. 8, 2010

(30) Foreign Application Priority Data

Jan. 5, 2009 (JP) ................................. 2009-000243

(51) Int. Cl.
G06F 15/00 (2006.01)
G06F 17/00 (2006.01)
(52) U.S. Cl. ...................................... 358/1.15; 715/273
(58) Field of Classification Search .................. 358/1.15
See application file for complete search history.

(56) References Cited

U.S. PATENT DOCUMENTS

2012/0057205 A1* 3/2012 Tashiro ........................ 358/1.15

FOREIGN PATENT DOCUMENTS

| JP | 2001-203834 | 7/2001 |
|----|-------------|--------|
| JP | 2002-44309 | 2/2002 |
| JP | 2004-242116 | 8/2004 |
| JP | 2007-124068 | 5/2007 |
| JP | 2007-267254 | 10/2007 |
| JP | 2008-241841 | 10/2008 |

OTHER PUBLICATIONS

Notification of Reasons for Refusal with English language translation mailed by the Japanese Patent Office on Oct. 16, 2012, in counterpart Japanese application No. 2009-000243.

* cited by examiner

Primary Examiner — Saeid Ebrahimi Dehkordy
(74) Attorney, Agent, or Firm — Finnegan, Henderson, Farabow, Garrett & Dunner, L.L.P.

(57) ABSTRACT

An image forming apparatus having functions pertaining to image formation includes: a display unit for displaying a screen corresponding to each function; a storage unit for storing the screens to be displayed on the display unit and start-up factor information, one of the screens stored as an initial screen related to the start-up factor information, the initial screen being displayed at a time of starting up the image forming apparatus; and a control unit for making the image forming apparatus start when the start-up factor information is input from an information obtaining unit in a state where the image forming apparatus is not in operation, for deciding the initial screen to be displayed on the display unit by comparing the input start-up factor information to the start-up factor information stored in the storage unit, and for making the display unit display the decided initial screen.

9 Claims, 9 Drawing Sheets

| COPY | SCAN | SAVE | READ | JOB LIST | MACHINE STATUS |

JOB OPERATION IS AVAILABLE BY SELECTING JOB FROM THE LIST.
☐ READY TO RECEIVE DATA.

| PREVIOUS JOB DOCUMENT | — | NUMBER OF RESERVED JOBS 0 | REMAINING MEMORY 0.000% | REMAINING HDD —% | ⟳ IMAGE ROTATION |

| JOB NO. | MODE | STATUS | NUMBER OF PAGES | NUMBER OF COPIES | NUMBER OF REMAINING PAGES | TIME (min.) | JOB OPERATION |
|---|---|---|---|---|---|---|---|
| | | | | | | | PRIORITY OUTPUT |
| | | | | | | | PRIORITY |
| | | | | | | | SUSPEND |
| | | | | | | | DELETE |
| | | | | | | | DETAILS |
| | | | | | | | |
| | | | | | | | DELETE ALL |

1/1

| NEXT PAGE | PREVIOUS PAGE | | | | | | |
| RESERVED JOB | OUTPUT HISTORY | TRANSMISSION HISTORY | NON-OUTPUT JOB | JOB IN SUSPENSION | JOB IN PROGRESS |

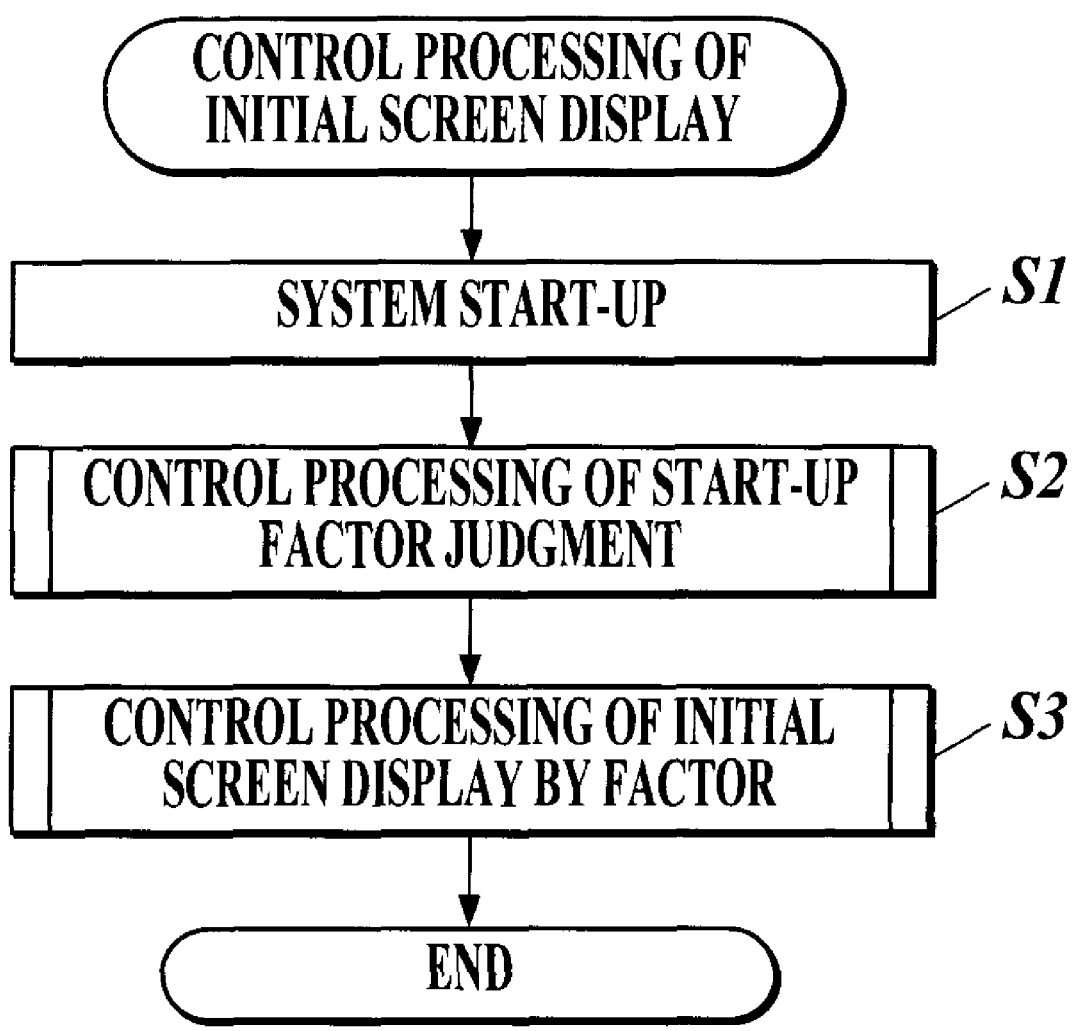

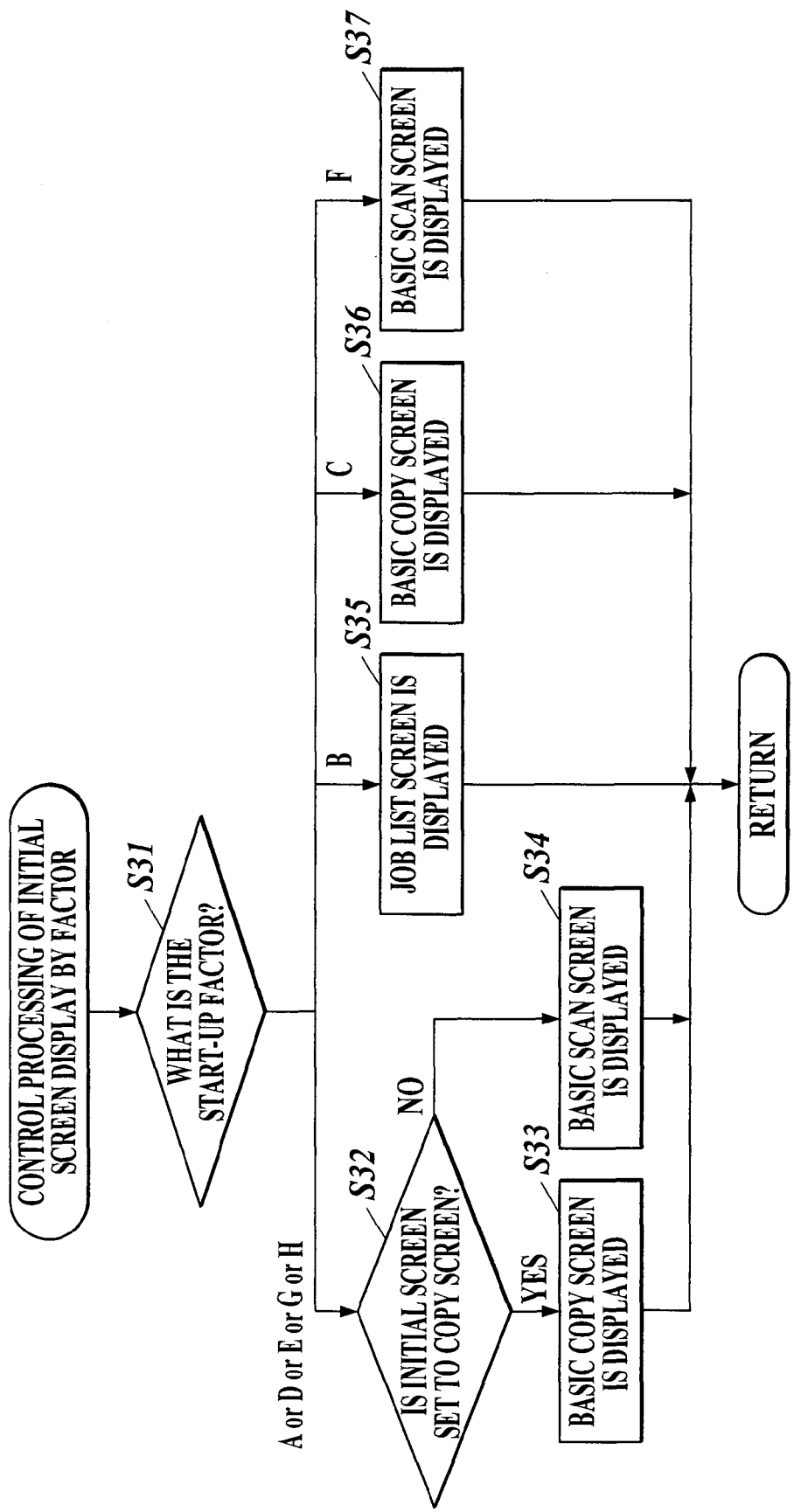

IMAGE FORMING APPARATUS AND INITIAL SCREEN DISPLAY METHOD

BACKGROUND OF THE INVENTION

1. Field of the Invention

The present invention relates to an image forming apparatus and an initial screen display method thereof.

2. Description of the Related Art

Currently, a composite image forming apparatus having a plurality of functions such as a copy function, a scan function, and a print function is developed. The image forming apparatus is provided with an operation panel, and a user inputs various instructions from the operation panel.

The operation panel can display various pieces of information such as a state of a job in progress in the image forming apparatus and a condition of a part composed of the image forming apparatus. The screen display is changed by user input from the operation panel.

Also, when the image forming apparatus is supplied with power and starts up, the operation panel displays an initial screen. Various technologies for deciding the initial screen to be displayed at a time of starting up the image forming apparatus are devised in order to improve initial operability for users.

Patent document 1 (Japanese Patent Application Laid-Open No. 2007-124068) discloses a technology for displaying an operation screen corresponding to a function which is preset or for displaying an operation screen based on frequency in use on a display unit of the image forming apparatus as an initial screen.

Patent document 2 (Japanese Patent Application Laid-Open No. 2007-267254) discloses a technology for setting a setting value in a memory, the setting value for specifying a function which is activated at a time of supplying power or the like, and for causing a display unit to display an initial screen corresponding to the function specified by the setting value.

SUMMARY OF INVENTION

With the technology described in the patent document 1, although an operation screen corresponding to a preset function or an operation screen based on frequency in use can be displayed as an initial screen at a time of starting up the image forming apparatus, the initial screen is not displayed according to a start-up factor of the image forming apparatus. Therefore, the initial operability for users does not improve. For example, when the image forming apparatus in a power save mode starts up due to a press of a button for using a scan function but a screen corresponding to a copy function is displayed as the initial screen, a user thereof needs to change the screen to a screen corresponding to the scan function.

With the technology described in the patent document 2 as well, although an initial screen is displayed based on a preset setting value, the initial screen is not displayed according to a start-up factor of the image forming apparatus. Therefore, the initial operability for users does not improve.

According to a first aspect of the present invention, an image forming apparatus having a plurality of functions pertaining to image formation comprises: a display unit for displaying a screen corresponding to each of the functions; a storage unit for storing the screens to be displayed on the display unit and start-up factor information on the image forming apparatus, one of the screens stored as an initial screen related to the start-up factor information, the initial screen being displayed at a time of starting up the image forming apparatus; an information obtaining unit for obtaining the start-up factor information; and a control unit for causing the image forming apparatus to start up when the start-up factor information is input from the information obtaining unit in a state where the image forming apparatus is not in operation, for deciding the initial screen to be displayed on the display unit by comparing the input start-up factor information to the start-up factor information stored in the storage unit, and for causing the display unit to display the decided initial screen.

Preferably, the start-up factor information is an on-signal of a power switch of the image forming apparatus, and the control unit causes the display unit to display a copy screen as the initial screen when the on-signal is input from the power switch.

Preferably, the image forming apparatus is connected to an external terminal or a tandem master machine so as to transmit and receive data, the start-up factor information is receipt notification information that print data transmitted from the external terminal or the tandem master machine is received, and the control unit causes the display unit to display a job list screen as the initial screen when the receipt notification information is input.

Preferably, the start-up factor information is a detection signal of a paper detection sensor, the detection signal that a placement of a document is detected, and the control unit causes the display unit to display the copy screen as the initial screen when the detection signal is input.

Preferably, the start-up factor information is a touch detection signal that a touch panel to input an instruction into the image forming apparatus is touched, and the control unit causes the display unit to display the copy screen as the initial screen when the touch detection signal is input.

Preferably, the start-up factor information is a signal that an operation button to input an instruction into the image forming apparatus is selected, and the control unit causes the display unit to display a screen corresponding to the signal as the initial screen when the signal is input.

Preferably, the start-up factor information is an auto reset instruction to instruct a restart of the image forming apparatus, and the control unit causes the display unit to display the copy screen as the initial screen when the auto reset instruction is input.

According to a second aspect of the present invention, an image forming apparatus having a plurality of functions pertaining to image formation and connected to an external terminal or a tandem master machine so as to transmit and receive data, the image forming apparatus comprises: a display unit for displaying a screen corresponding to each of the functions; a storage unit for storing the screens to be displayed on the display unit and start-up factor information on the image forming apparatus, one of the screens stored as an initial screen related to the start-up factor information, the initial screen being displayed at a time of starting up the image forming apparatus; an information obtaining unit for obtaining the start-up factor information; and a control unit for causing the image forming apparatus to start up when the start-up factor information is input from the information obtaining unit in a state where the image forming apparatus is not in operation, for deciding the initial screen to be displayed on the display unit by comparing the input start-up factor information to the start-up factor information stored in the storage unit, and for causing the display unit to display the decided initial screen, wherein the start-up factor information is one of an on-signal of a power switch of the image forming apparatus; and receipt notification information that print data transmitted from the external terminal or the tandem master machine is received, and the control unit causes the display unit to display a copy screen as the initial screen when the on-signal is input from the power switch, and to display a job list screen as the initial screen when the receipt notification information is input.

According to a third aspect of the present invention, an initial screen display method of displaying an initial screen at a time of starting up an image forming apparatus, the image forming apparatus having a plurality of functions pertaining to image formation comprising a display unit for displaying a screen corresponding to each of the functions, a storage unit for storing the screens to be displayed on the display unit and start-up factor information, one of the screens stored as an initial screen related to the start-up factor information, the initial screen being displayed at a time of starting up the image forming apparatus, and a control unit, the initial screen display method comprises the steps of: starting up the image forming apparatus when the start-up factor information is input in a state where the image forming apparatus is not in operation; deciding the initial screen to be displayed on the display unit by comparing the input start-up factor information to the start-up factor information stored in the storage unit; and causing the display unit to display the decided initial screen, the steps performed by the control unit.

BRIEF DESCRIPTION OF THE DRAWINGS

The present invention will be understood fully from the detailed description given hereinbelow and the accompanying drawings, which are given by way of illustration only, and thus are not intended as a definition of the limits of the present invention, and wherein:

FIG. 5 is an example of a scan screen displayed on the LCD of FIG. 2;

FIG. 6 is an example of a job list screen displayed on the LCD of FIG. 2;

FIG. 7 is a flow chart showing control processing of initial screen display according to the embodiment of the present invention;

FIG. 9 is a flow chart showing control processing of initial screen display by factor according to the embodiment of the present invention.

DETAILED DESCRIPTION OF THE PREFERRED EMBODIMENT

Figure 1:
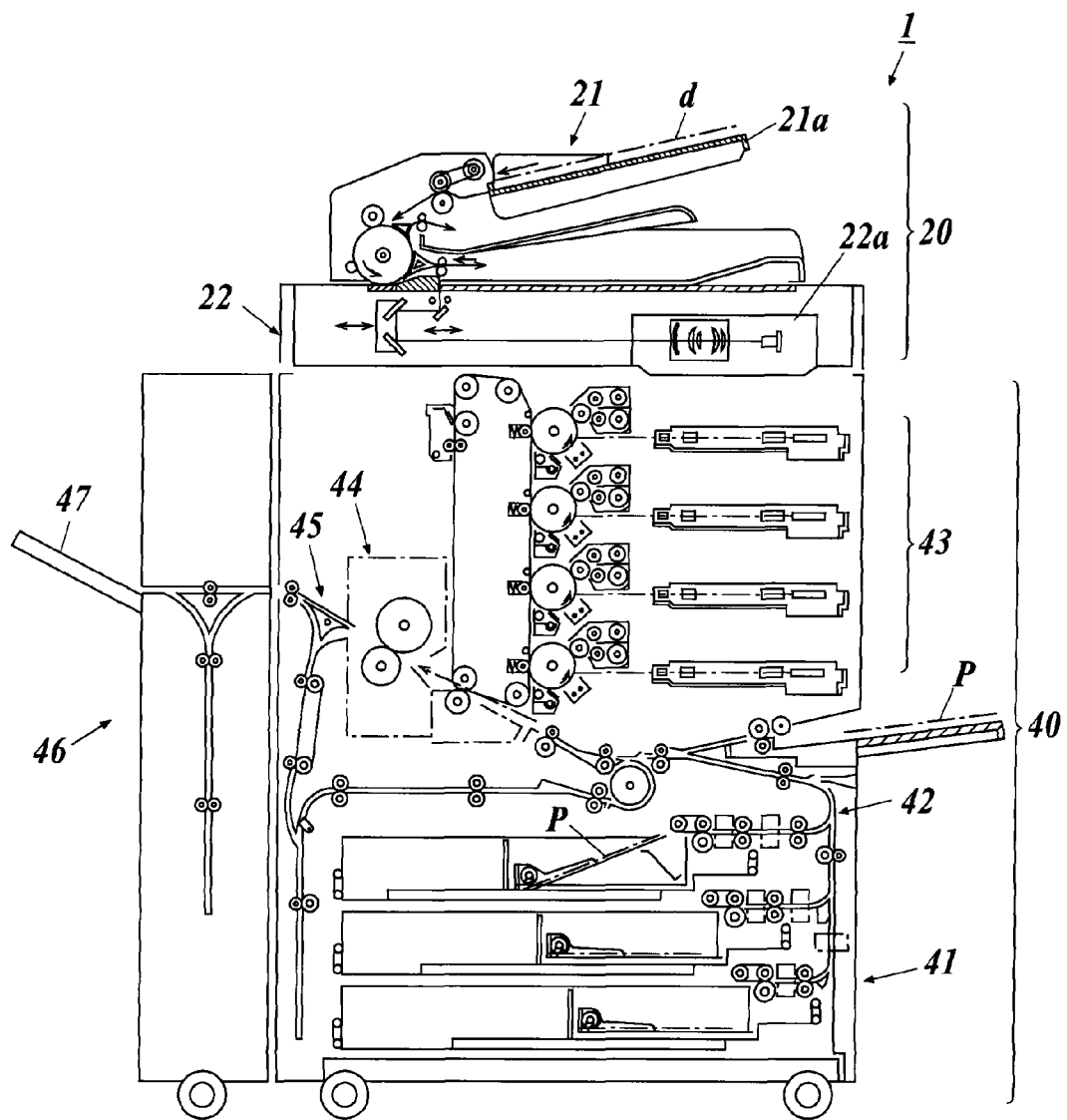
FIG. 1 is a schematic cross-sectional view showing a configuration of an image forming apparatus according to an embodiment of the present invention.

Hereinafter, an embodiment according to the present invention will be described in details referring to the drawings.

First, a configuration of the present invention is described.

FIG. 1 shows a schematic cross-sectional view showing a configuration of an image forming apparatus 1 according to an embodiment of the present invention.

As shown in FIG. 1, the image forming apparatus 1 includes an image reading unit 20 and a printing unit 40. The image forming apparatus 1 has a plurality of functions such as a copy function, a scan function, and a print function. With the copy function, an image is read from a document d, and the read image is formed on paper P and output. With the scan function, an image is read from document d, and data of the read image is transmitted to an external terminal 2 via an e-mail or the like. With the print function, a job including page data having image data, a condition for forming an image from the image data, and the like is received from the external terminal 2 or the like, and the image is formed on paper P based on the received job and output.

The image reading unit 20 includes an auto document sending unit 21 having an auto document feeder (ADF) and a paper detection sensor 21a, and a reading unit 22. A placement of a document d on a document tray 21b is detected by the paper detection sensor 21a of the auto document sending unit 21, and the detection signal of the paper detection sensor 21a is transmitted to a control unit 110 described below.

The document d placed on the document tray 21b is carried to a contact glass where readings are performed. Images on one side or both sides of the document d are read by an optical system such as a charge coupled device (CCD) 22a. The image read by the CCD 22a has not only image data such as a figure and a photo but also text data such as a character and a symbol, and the like.

The image (analog image signal) read by the image reading unit 20 is output to a reading processing unit 140, which is described below, of an image control board 100. At the reading processing unit 140, the image is converted from analog to digital, and various image processing is performed. The image is output to the printing unit 40 thereafter.

The printing unit 40 performs electrophotographic image forming processing based on the input print data. The printing unit 40 includes a paper feed unit 41, a carry unit 42, an image forming unit 43, a fixing unit 44, a carry-out unit 45, and a carry-out waiting unit 46.

The paper feed unit 41 includes a plurality of paper feed trays in which paper P is stored according to the weight or the size thereof, a paper feed device to feed paper P to the carry unit 42, and a manual bypass tray from which paper P placed on the manual bypass tray is carried one by one to the carry unit 42 by a paper feed roller.

The carry unit 42 carries the paper P, which is carried from the paper feed unit 41, to a second transfer roller through a plurality of intermediate rollers, a registration roller, and the like, and then to the image forming unit 43.

The image forming unit 43 includes a charged device, an exposure device, and an intermediate transfer belt, which are set around a photo sensitive drum. The image forming unit 43 transfers a toner image onto the intermediate transfer belt, the toner image which is developed from an electrostatic latent image based on image data, and forms an image having a maximum of four colors, yellow (Y), magenta (M), cyan (C), and black (B). The image forming unit 43 also removes remaining electric charge, remaining toner, and the like from a surface of the photo sensitive drum after toner is transferred onto the intermediate transfer belt, which is the first transfer.

The fixing unit 44 includes a rotatable fixing member such as a heat roller and a heat belt which have a heat source, and a pressure roller which forms a nip portion with the rotatable fixing member by contact pressure. The fixing unit 44 fixes the toner image transferred onto the paper P, which is the second transfer, with heat.

The carry-out unit 45 includes a plurality of paper ejection rollers, a carry-out exit, and a change route of a paper ejection face. The carry-out unit 45 carries out the paper P on which the toner image is fixed, the paper P which is held between the paper ejection rollers, to the carry-out waiting unit 46 through the carry-out exit, or to the change route of a paper ejection face to change a face of the paper P and then to the carry-out waiting unit 46 through the carry-out exit.

The carry-out waiting unit 46 includes a plurality of paper ejection rollers and a carry-out route. The carry-out waiting unit 46 carries the paper P, which is carried in from the carry-out exit of the carry-out unit 45, to the carry-out route, and ejects the paper P to a paper ejection tray 47 thereafter.

Figure 2:
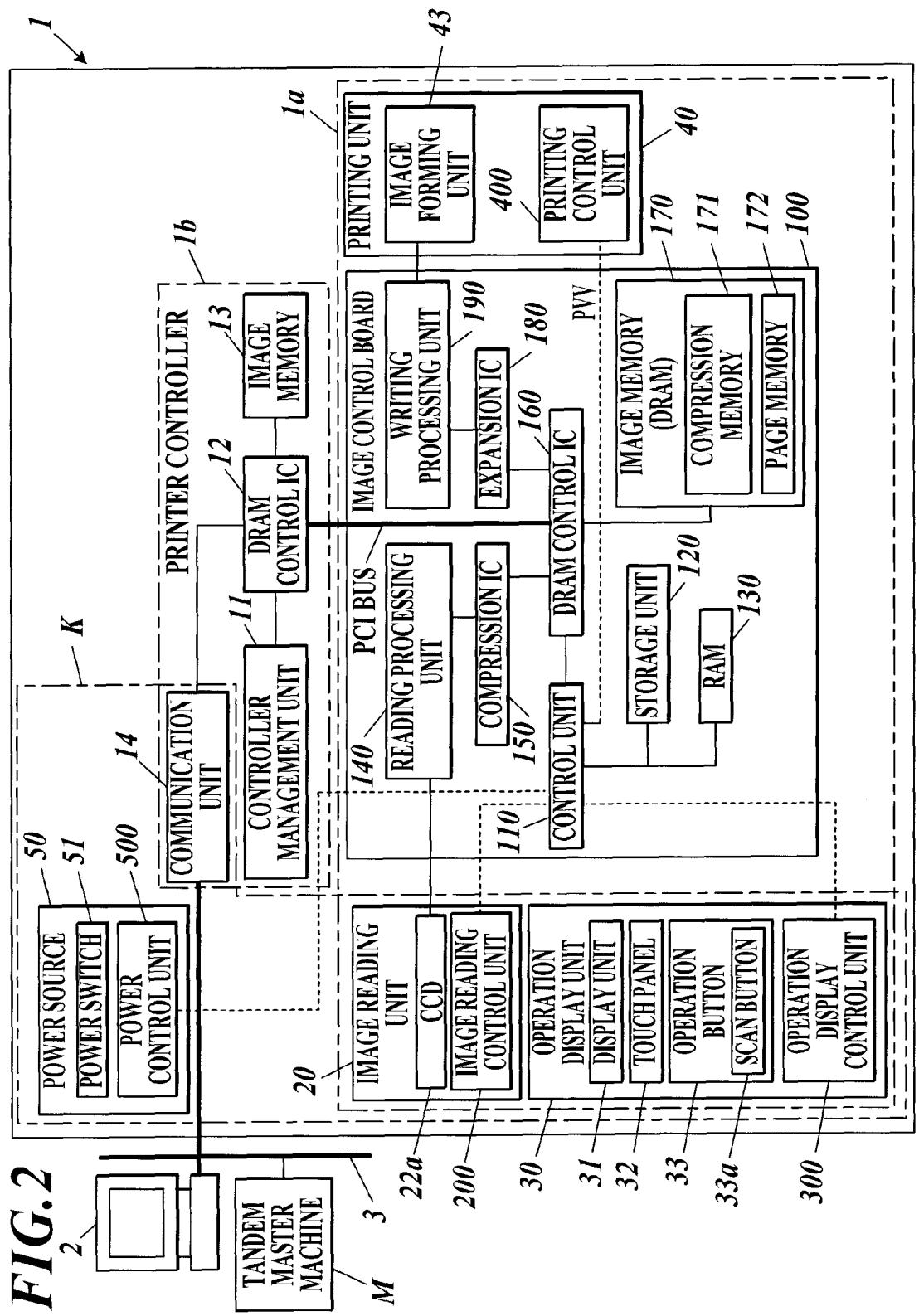
FIG. 2 is a control block diagram of the image forming apparatus of FIG. 1.

FIG. 2 shows a control block diagram of the image forming apparatus 1.

As shown in FIG. 2, the image forming apparatus 1 is composed of a main body 1a and a printer controller 1b. The image forming apparatus 1 is connected to the external terminal 2 or a tandem master machine M, which is on a network 3, via a local area network interface (LANIF) 14 of the printer controller 1b, so as to transmit and receive data with each other. The tandem master machine M has almost the same functions as the image forming apparatus 1, and manages a plurality of image forming apparatuses. When print data is input from the tandem master machine M into the image forming apparatus 1, the image forming apparatus 1 forms an image based on the print data.

The main body 1a is composed of the image reading unit 20, an operation display unit 30 having a display unit 31, a touch panel 32, and the like, the printing unit 40, a power source 50, and the image control board 100. The same reference numerals or letters are attached to the units explained referring to FIG. 1 and explanation thereof will be omitted.

A control unit 110 includes a central processing unit (CPU). The control unit 110 reads a specified program from a system program and application programs which are stored in a storage unit 120, and loads the read program into a RAM 130. With the program loaded into the RAM 130, the control unit 110 performs various processing for centralized control of the parts composed of the image forming apparatus 1.

The control unit 110 also controls a start-up of the image forming apparatus 1 based on a start-up factor which is input from the external terminal 2, the power source 50, or the like. The start-up factor is an instruction which is input into the control unit 110 to start up the image forming apparatus 1 being not in operation. The communication unit 14, the paper detection sensor 21a, the operation display unit 30, and the power source 50 function as an information obtaining unit K which inputs the start-up factor into the control unit 110. In the embodiment of the present invention, the state of the image forming apparatus 1 which is not in operation is defined as follows: power supply to all the parts of the image forming apparatus 1 stops by turning off a power switch 51, the image forming apparatus 1 is in a power save mode, or the image forming apparatus 1 briefly stops for auto reset, the power save mode and the auto reset described below.

Figure 3:
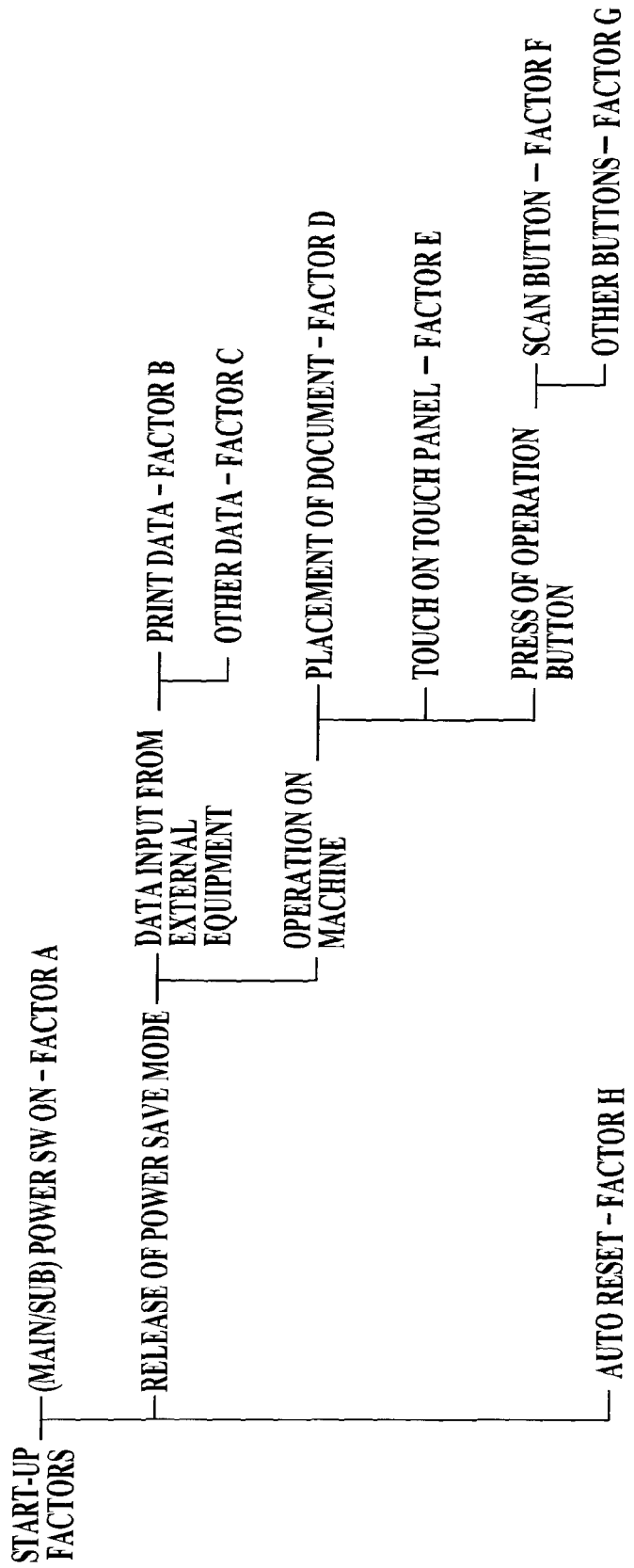
FIG. 3 is a list of start-up factors according to the embodiment of the present invention.

FIG. 3 shows an example of the start-up factors for the image forming apparatus 1. As shown in FIG. 3, the start-up factors for the image forming apparatus 1 which is not in operation are divided into three groups, the power switch ON, release of the power save mode, and the auto reset.

The power switch ON is that the power switch 51 described below is turned on (hereinafter a start-up factor A).

The release of the power save mode are performed by data input from external equipment such as the external terminal 2, or by user operation on a machine, namely, on the image forming apparatus 1. The power save mode is one of the modes to stop a system, and stops power supply from the power source 50 to predetermined parts among the parts composed of the image forming apparatus 1. When the start-up factor for releasing the power save mode is input into the image forming apparatus 1 which is in the power save mode, an instruction to start power supply from the power source 50 to the predetermined parts is transmitted to a power control unit 500.

The data input from external equipment is that print data is input from the external terminal 2 or the tandem master machine M via the communication unit (hereinafter a factor B), or that data other than print data is input from the tandem master machine M (hereinafter a factor C).

The operation on the machine is defined as a placement of a document d on the ADF of the image reading unit 20 (hereinafter a factor D), a touch on the touch panel 32 (hereinafter a factor E), or a press of an operation button 33. The press of the operation button 33 is divided into two groups, a press of a scan button 33a (hereinafter a factor F) and a press of another button (hereinafter a factor G).

The auto reset is defined as a restart of the image forming apparatus 1 after a brief stop. The auto reset may be performed by the control unit 110 every certain period of time, or by a touch on the touch panel 32. That the auto reset is the start-up factor is that an instruction to restart the image forming apparatus 1 which is in a brief stop is input into the control unit 110 (hereinafter a factor H).

Here, FIG. 2 is referred again. The storage unit 120 stores processing programs and data pertaining to image formation, a program for control processing of initial screen display according to the embodiment of the present invention, data processed by those programs, and the like. The storage unit 120 also stores the initial screens for each of the start-up factors, the initial screens to be displayed on the display unit 31 at a time of starting up a system.

The RAM 130 functions as a work area to temporarily store programs run by the control unit 110 and data of the programs, data composed of a job, and the like.

The reading processing unit 140 processes the analog image signal, which is input from an image reading control unit 200 of the image reading unit 20, by analog signal processing, analog-digital conversion, shading, and the like, and thereafter digital image data is created. The created image data is output to a compression IC 150.

The compression IC 150 compresses the input digital image data, and outputs the data to a dynamic RAM (DRAM) control IC 160.

The DRAM control IC 160 controls compression of image data by the compression IC 150 and expansion of the compressed image data by an expansion IC 180, and also controls input and output of image data into/from an image memory 170, in accordance with an instruction from the control unit 110. For example, when storage of an image signal read by the image reading unit 20 is instructed, the DRAM control IC 160 causes the compression IC 150 to compress image data which is input from the reading processing unit 140, and causes a compression memory 171 of the image memory 170 to store the compressed image data. When printout of the compressed image data stored in the compression memory 171 is instructed, the DRAM control IC 160 reads the compressed image data from the compression memory 171, causes the expansion IC 180 to expand the image data, and then causes a page memory 172 to store the image data. When printout of the image data stored in the page memory 172 is instructed, the DRAM control IC 160 reads the image data from the page memory 172 and outputs the image data to a writing processing unit 190.

The image memory 170 has the compression memory 171 and the page memory 172, both of which are composed of DRAM. The compression memory 171 stores compressed image data, and the page memory 172 temporarily stores image data for printout (print data).

The expansion IC 180 expands compressed image data.

The writing processing unit 190 creates print data for image formation based on image data which is input from the DRAM control IC 160, and outputs the print data to the printing unit 40.

The operation display unit 30 includes the display unit 31 such as a LCD, the touch panel 32 provided such that the display unit 31 is covered, the operation button 33 (the scan button 33a included) such as a numeric keypad to input an instruction, and an operation display control unit 300. The operation display control unit 300 causes the display unit 31 to display a screen corresponding to each of functions of the image forming apparatus 1 based on a display signal which is input from the control unit 110. Also, the operation display control unit 300 receives an instruction selected by a touch on the touch panel 32 or a press of the operation button 33, and outputs an operation signal to the control unit 110 based on the selected instruction.

Figure 4:
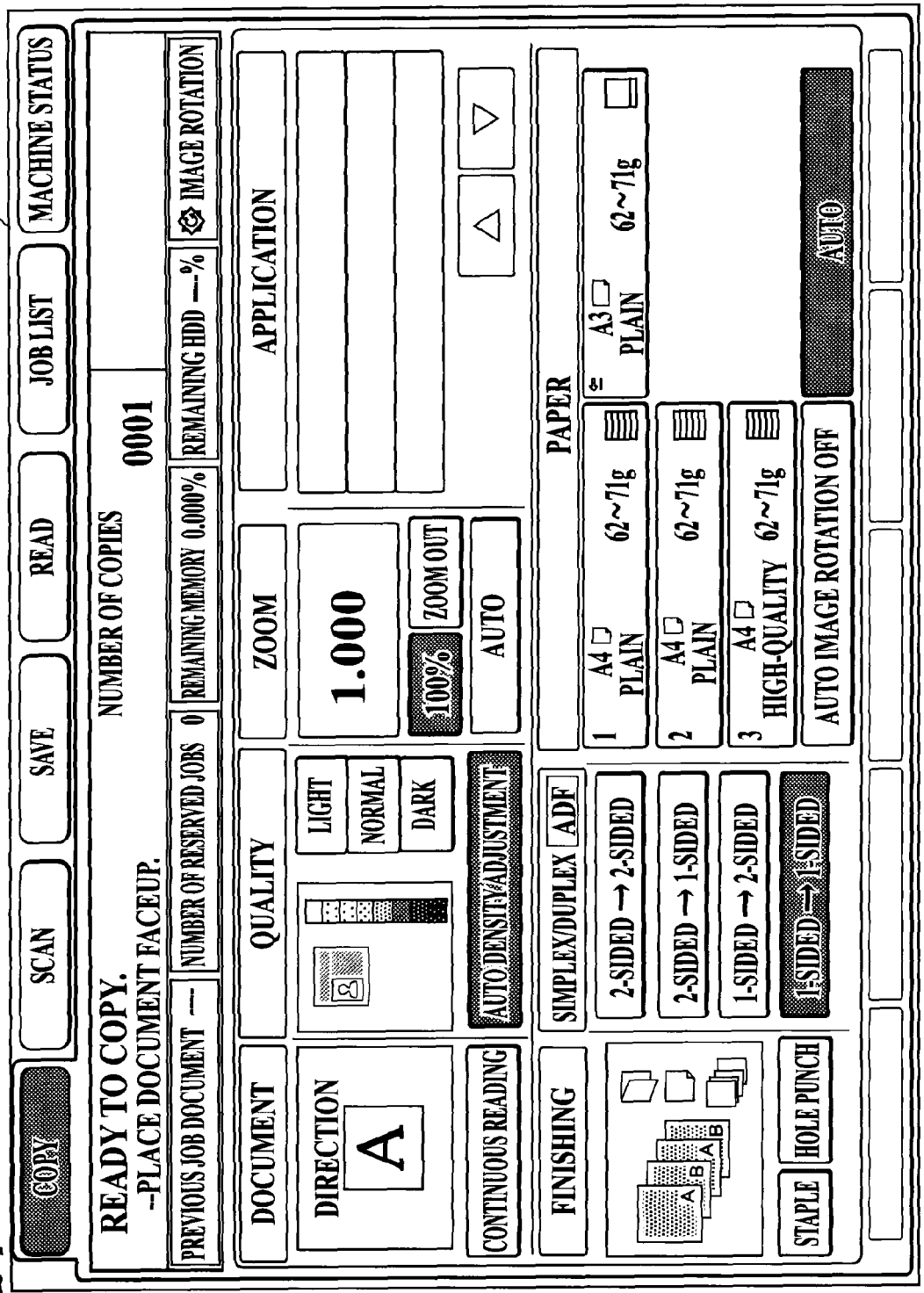
FIG. 4 is an example of a copy screen displayed on a liquid crystal display (LCD) of FIG. 2.

FIG. 4 shows a copy screen 311 displayed on the display unit 31 by the operation display control unit 300. The copy screen 311 is for allowing the image reading unit 20 to read a document d, and instructing the printing unit 40 to start image formation.

Figure 5:
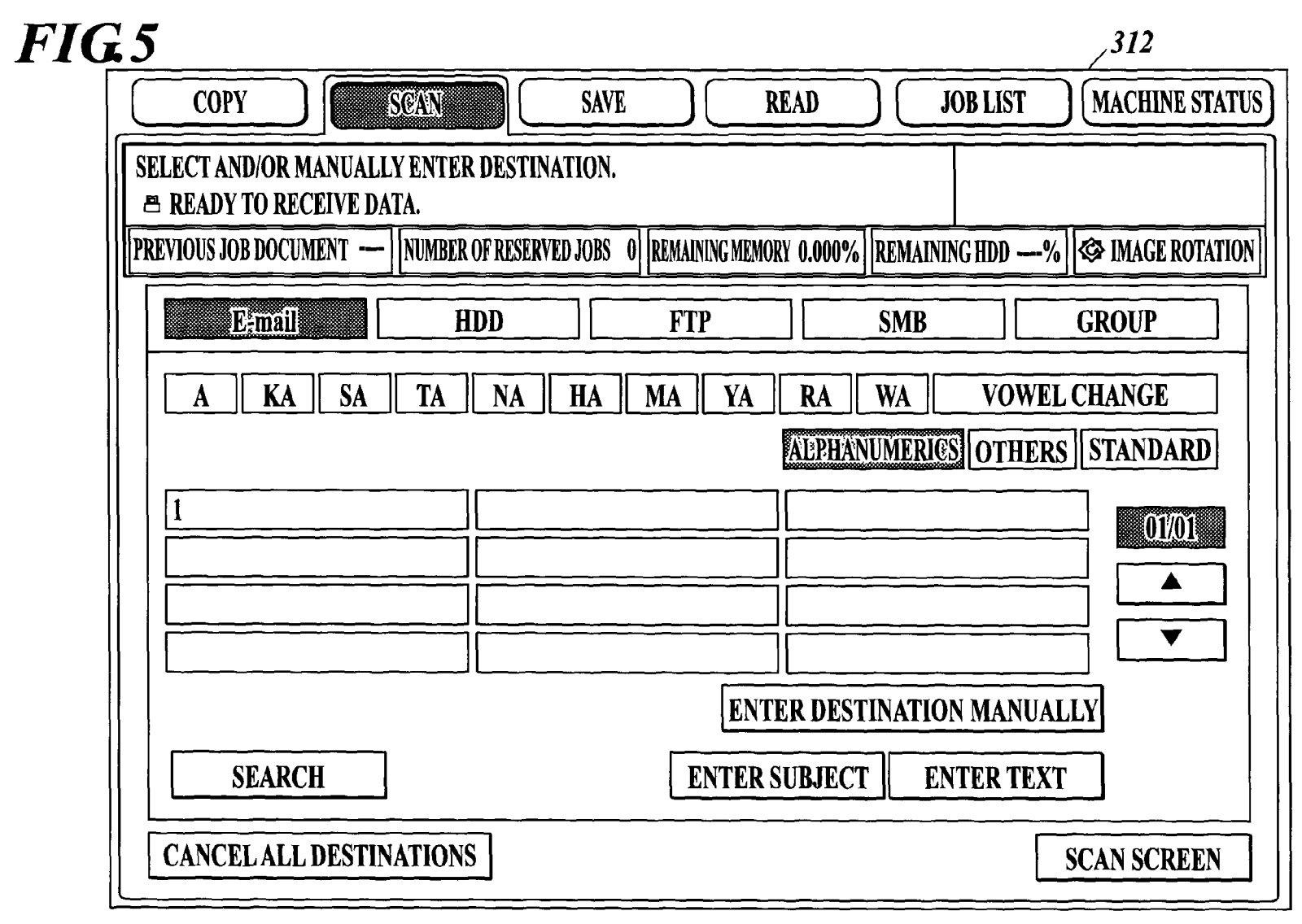

FIG. 5 shows a scan screen 312 displayed on the display unit 31 by the operation display control unit 300. The scan screen 312 is for allowing the image reading unit 20 to read a document d, and storing the read data into the storage unit 120 or inputting an instruction to transmit the read data to the external terminal 2 via the communication unit 14.

FIG. 6 shows a job list screen 313 displayed on the display unit 31 by the operation display control unit 300. The job list screen 313 is for displaying a list of jobs which are in progress in the image forming apparatus 1, or for instructing rearrangement of an order of jobs to be carried out.

The copy screen 311, the scan screen 312, and the job list screen 313 can be displayed by input of an instruction from the touch panel 32. Further, the screens for a job storage function, for job readings, and for machine status display (all not shown) can also be displayed on the display unit 31. The screen displayed on the display unit 31 can be changed by input of an instruction from the touch panel 32.

The printing unit 40 includes the paper feed unit 41, the carry unit 42, the image forming unit 43, the fixing unit 44, the carry-out unit 45, and the carry-out waiting unit 46 which are involved with printout, the units shown in FIG. 1, and a printing control unit 400. The printing control unit 400 includes a CPU, a ROM, and a RAM. The printing control unit 400 controls an operation of each unit of the printing unit 40 in accordance with an instruction from the control unit 110. By the control of the printing control unit 400, paper P is carried for forming an image thereon based on print data which is input from the writing processing unit 190, and the paper P is ejected to the paper ejection tray 47.

The power source 50 includes the power switch 51 and the power control unit 500. The power source 50 supplies external power to every part of the image forming apparatus 1. The power switch 51 includes a main power switch and a sub power switch for instructing to supply or not to supply the power, and inputs the instruction into the power control unit 500.

The power control unit 500 controls the power supply, and supplies the external power to every part of the image forming apparatus 1 when an instruction to supply the power is input from the power switch 51 or the control unit 110.

Next, each part of the printer controller 1b will be described. The printer controller 1b manages and controls data transmitted to the image forming apparatus 1 from the external terminal 2, which is connected to the network 3, when the image forming apparatus 1 is used as a network printer. The printer controller 1b receives print data from the external terminal 2 and transmits the print data to the main body 1a as a job.

The printer controller 1b is composed of a controller management unit 11, a DRAM control IC 12, an image memory 13, and the communication unit 14.

The controller management unit 11 integrally controls operations of the parts composed of the printer controller 1b, and transmits data which is input from the external terminal 2 to the main body 1a via the communication unit 14 as a job.

The DRAM control IC 12 controls storage of data received by the communication unit 14 into the image memory 13 and data readings from the image memory 13. The DRAM control IC 12 is connected to the DRAM control IC 160 of the image control board 100 by a peripheral components interconnect (PCI) bus, and reads print data from the image memory 13 and outputs the print data to the DRAM control IC 160 in accordance with an instruction from the controller management unit 11.

The image memory 13 is composed of DRAM, and temporarily stores print data which is input by the DRAM control IC 12.

The communication unit 14 is a communication interface such as a network interface card (NIC) and a modem to connect to the network 3 such as a LAN. The communication unit 14 receives data from the external terminal 2 or the tandem master machine M. The received data is output to the DRAM control IC 12.

Next, an operation of the embodiment of the present invention will be described.

FIG. 7 shows a flow chart of control processing of initial screen display, which is performed by the control unit 110 when a start-up factor is input into the control unit 110 of the image forming apparatus 1 not being in operation. The control processing of initial screen display is performed by the control unit 110 and a program stored in the storage unit 120 running together.

First, the image forming apparatus 1 starts up (Step S1). Next, control processing of start-up factor judgment is performed (Step S2) to judge a start-up factor. Based on the judged start-up factor, control processing of initial screen display by factor is performed (Step S3).

Figure 8:
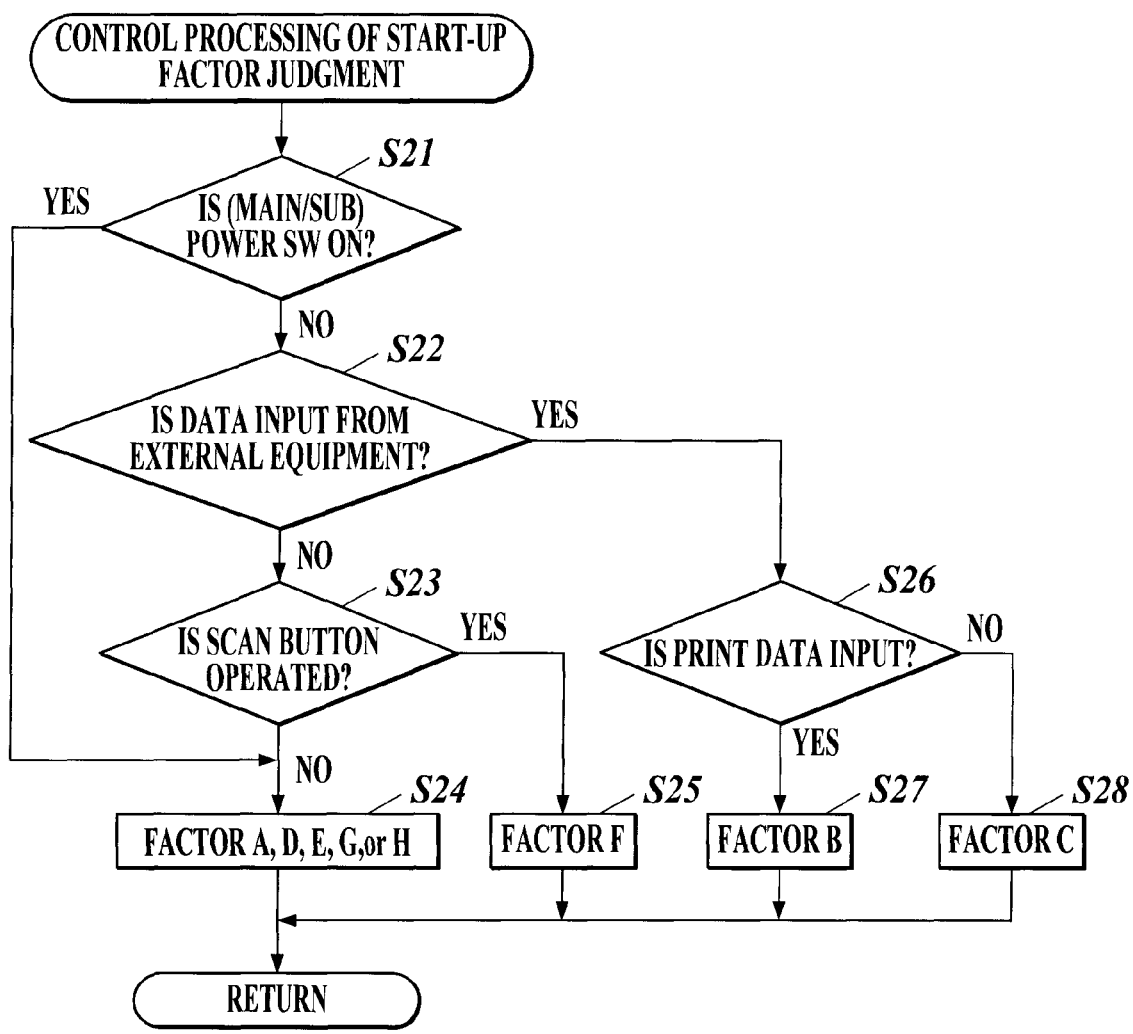
FIG. 8 is a flow chart showing control processing of start-up factor judgment according to the embodiment of the present invention.

FIG. 8 shows a flow chart of the control processing of start-up factor judgment performed at Step S2. The control processing of start-up factor judgment is performed by the control unit 110 and the program stored in the storage unit 120 running together.

First, whether the start-up factor is an instruction being input by turning on the main power switch or the sub power switch of the power switch 51 or not is judged (Step S21). When it is not judged that the instruction is input by turning on the main power switch or the sub power switch (Step S21; NO), whether the instruction is input by data input from the external equipment or not is judged (Step S22).

When it is not judged that the instruction is input by data input from the external equipment (Step S22; NO), whether the instruction is input by pressing the scan button 33a or not is judged (Step S23).

When it is judged that the instruction is input by tuning on the main power switch or the sub power switch of the power switch 51 (Step S21; YES), or not judged that the instruction is input by pressing the scan button 33a (Step S23; NO), the start-up factor being the factor A, D, E, G, or H is stored into the RAM 130 (Step S24). When it is judged that the instruction is input by pressing the scan button 33a (Step S23; YES), the start-up factor being the factor F is stored into the RAM 130 (Step S25).

When it is judged that the instruction is input by data input from the external equipment (Step S22; YES), whether the data is print data being input from the external terminal 2 or the tandem master machine M or not is judged (Step S26).

When it is judged that the input data is print data (Step S26; YES), the start-up factor being the factor B is stored into the RAM 130 (Step S27).

When it is not judged that the input data is print data (Step S26; NO), the start-up factor being the factor C is stored into the RAM 130 (Step 28).

In this manner, the start-up factor is stored into the RAM 130 at Step 24, 25, 27, or 28, and the control processing of start-up factor judgment finishes.

FIG. 9 shows a flow chart of the control processing of initial screen display by factor performed at Step S3. The control processing of initial screen display by factor is performed by the control unit 110 and the program stored in the storage unit 120 running together.

First, what the start-up factor stored in the RAM 130 is judged (Step S31). When the start-up factor is the factor A, D, E, G, or H (Step S31; A, D, E, G, or H), a setting of the initial screens for each of the start-up factors is referred, the setting which is stored in the storage unit 120, and whether the initial screen is set to the copy screen 311 or not is judged (Step S32).

When it is judged that the initial screen is set to the copy screen 311 (Step S32; YES), an instruction to cause the display unit 31 to display the copy screen 311 is transmitted to the operation display control unit 300 (Step S33).

When it is not judged that the initial screen is set to the copy screen 311 (Step S32; NO), an instruction to cause the display unit 31 to display the scan screen 312 is transmitted to the operation display control unit 300 (Step S34).

When the start-up factor is the factor B (Step S31; B), the setting of the initial screens for each of the start-up factors is referred, the setting which is stored in the storage unit 120, and an instruction to cause the display unit 31 to display the job list screen 313 is transmitted to the operation display control unit 300 (Step S35).

When the start-up factor is the factor C (Step 31; C), the setting of the initial screens for each of the start-up factors is referred, the setting which is stored in the storage unit 120, and an instruction to cause the display unit 31 to display the copy screen 311 is transmitted to the operation display control unit 300 (Step S36).

When the start-up factor is the factor F (Step S31; F), the setting of the initial screens for each of the start-up factors is referred, the setting which is stored in the storage unit 120, and an instruction to cause the display unit 31 to display the scan screen 312 is transmitted to the operation display control unit 300 (Step S37).

As described above, the image forming apparatus 1 of the embodiment of the present invention can decide the initial screen in accordance with the start-up factor therefor by the control processing of initial screen display, and cause the display unit 31 to display the decided initial screen at the time of starting up the image forming apparatus 1. Consequently, users of the image forming apparatus 1 can start an operation from the initial screen, and accordingly the initial operability can improve.

In addition, the start-up factors A, D, E, G, and H allow the copy screen or the scan screen to display based on the setting of the initial screens, and accordingly the initial operability can improve. Furthermore, the start-up factors B, C, and F allow the job list screen, the copy screen, and the scan screen to display respectively, and accordingly the initial operability can improve.

The embodiment of the present invention described above is a preferred embodiment of the image forming apparatus of the present invention. Thus the scope of the present invention is not limited to the given embodiment.

For example, in the embodiment, the start-up factors are the factors A to H. However, as long as the start-up factors are predetermined, and instruct a start-up of the image forming apparatus 1, the start-up factors are not limited to those of the given embodiment. Input of the number of copies from a numeric keypad may be used as a start-up factor, for example.

The initial screens corresponding to each of the start-up factors are also not limited to those of the given embodiment as long as the initial screens are predetermined and stored in the storage unit 120. For example, the initial screen may be the copy screen or the scan screen when the image forming apparatus 1 starts up by the start-up factor which is the input from a numeric keypad as mentioned above. The initial screen for another start-up factor may be set by a user of the image forming apparatus 1 at choice as well.

As the computer readable storage mediums for the storage unit 120 of the embodiment of the present invention, a portable storage medium such as a nonvolatile memory such as a flash memory e.g. a secure digital (SD) card and a universal serial bus (USB) memory, and a CD-ROM can be used. Furthermore, various kinds of data such as the data of the programs and sound data of the present invention can be provided via a communication line by overlaying these data on a carrier wave.

The details of the configuration and the operation of each part composed of the image forming apparatus 1 can also be changed without departing from the scope of the present invention.

The entire disclosure of Japanese Patent Application No. 2009-000243 filed on Jan. 5, 2009 including description, claims, drawings, and abstract are incorporated herein by reference in its entirety.

What is claimed is:

1. An image forming apparatus having a plurality of functions pertaining to image formation, comprising:
  a display unit for displaying a screen corresponding to each of the functions;
  a storage unit for storing a plurality of screens to be selected and displayed as an initial screen on the display unit, and start-up factor information for a plurality of start-up factors of the image forming apparatus, each of the plurality of screens stored corresponding to one or more of the plurality of start-up factors;
  an information obtaining unit for obtaining the start-up factor information; and
  a control unit for causing the image forming apparatus to start up when the start-up factor information is input from the information obtaining unit in a state where the image forming apparatus is not in operation, for selecting the initial screen from the plurality of screens stored in the storage unit corresponding to the input start-up factor information, and for causing the display unit to display the selected initial screen at a time of starting up the image forming apparatus.

2. An image forming apparatus according to claim 1, wherein
  the start-up factor information is an on-signal of a power switch of the image forming apparatus; and the control unit causes the display unit to display a copy screen as the initial screen when the on-signal is input from the power switch.

3. An image forming apparatus according to claim 1, wherein
the image forming apparatus is connected to an external terminal or a tandem master machine so as to transmit and receive data;
the start-up factor information is receipt notification information that print data transmitted from the external terminal or the tandem master machine is received; and
the control unit causes the display unit to display a job list screen as the initial screen when the receipt notification information is input.

4. An image forming apparatus according to claim 1, wherein
the start-up factor information is a detection signal of a paper detection sensor, the detection signal that a placement of a document is detected; and
the control unit causes the display unit to display a copy screen as the initial screen when the detection signal is input.

5. An image forming apparatus according to claim 1, wherein
the start-up factor information is a touch detection signal that a touch panel to input an instruction into the image forming apparatus is touched; and
the control unit causes the display unit to display a copy screen as the initial screen when the touch detection signal is input.

6. An image forming apparatus according to claim 1, wherein
the start-up factor information is a signal that an operation button to input an instruction into the image forming apparatus is selected; and
the control unit causes the display unit to display a screen corresponding to the signal as the initial screen when the signal is input.

7. An image forming apparatus according to claim 1, wherein
the start-up factor information is an auto reset instruction to instruct a restart of the image forming apparatus; and
the control unit causes the display unit to display a copy screen as the initial screen when the auto reset instruction is input.

8. An image forming apparatus having a plurality of functions pertaining to image formation and connected to an external terminal or a tandem master machine so as to transmit and receive data, the image forming apparatus comprising:
a display unit for displaying a screen corresponding to each of the functions;
a storage unit for storing the screens to be displayed on the display unit and start-up factor information on the image forming apparatus, one of the screens stored as an initial screen related to the start-up factor information, the initial screen being displayed at a time of starting up the image forming apparatus;
an information obtaining unit for obtaining the start-up factor information; and
a control unit for causing the image forming apparatus to start up when the start-up factor information is input from the information obtaining unit in a state where the image forming apparatus is not in operation, for deciding the initial screen to be displayed on the display unit by comparing the input start-up factor information to the start-up factor information stored in the storage unit, and for causing the display unit to display the decided initial screen,
wherein
the start-up factor information is one of
an on-signal of a power switch of the image forming apparatus; and
receipt notification information that print data transmitted from the external terminal or the tandem master machine is received, and
the control unit causes the display unit to display a copy screen as the initial screen when the on-signal is input from the power switch, and to display a job list screen as the initial screen when the receipt notification information is input.

9. An initial screen display method of displaying an initial screen at a time of starting up an image forming apparatus, the image forming apparatus having a plurality of functions pertaining to image formation comprising a display unit for displaying screens corresponding to each of the plurality of functions, a storage unit for storing the screens to be displayed on the display unit, and a control unit, the initial screen display method comprising the steps of:
storing a plurality of screens to be selected and displayed as an initial screen on the display unit, and start-up factor information for a plurality of start-up factors of the image forming apparatus, each of the plurality of screens stored corresponding to one or more of the plurality of start-up factors;
starting up the image forming apparatus when the start-up factor information is input in a state where the image forming apparatus is not in operation;
selecting the initial screen from the plurality of screens stored in the storage unit corresponding to the input start-up factor information; and
causing the display unit to display the selected initial screen at a time of starting up the image forming apparatus.

\* \* \* \* \*